Sept. 17, 1963      D. J. THEOBALD      3,104,353

TRANSISTORIZED OVERLOAD AND SHORT-CIRCUIT PROTECTION DEVICE

Filed Dec. 21, 1960

INVENTOR.
DONALD J. THEOBALD
BY
ATTORNEYS

United States Patent Office

3,104,353
Patented Sept. 17, 1963

3,104,353
TRANSISTORIZED OVERLOAD AND SHORT-CIRCUIT PROTECTION DEVICE
Donald J. Theobald, 5450 Linda Rosa Ave.,
La Jolla, Calif.
Filed Dec. 21, 1960, Ser. No. 77,476
10 Claims. (Cl. 323—22)
(Granted under Title 35, U.S. Code (1952), sec. 266)

The invention described herein may be manufactured and used by or for the Government of the United States of America for governmental purposes without the payment of any royalties thereon or therefor.

The present invention relates in general to electrical circuit protection apparatus and concerns, in particular, a transistorized overload and short circuit protection device for power supplies and associated electronic utilization equipment incorporating transistor, semiconductor, and superconductor devices.

Although many overload and short-circuit protection devices exist in the prior art, none of them will actuate, trip, or switch-off fast enough to prevent semiconductor damage and possible damage to the electrical components associated therewith, in event they are overloaded due to a defective power supply or internal trouble within the load itself containing said components. Hence, such electrical protection devices as overload relays, fuses, and the like are ordinarily too slow and, thus, are inadequate as a means for protecting transistorized circuitry, such as might be incorporated in communication, search, echo-ranging, or computing apparatus, while they may be completely satisfactory for their originally intended purposes.

Other known protection means such as may be accomplished by paralleling the series regulating transistors of the associated power supply until the parallel power handling capabilities are sufficient to carry both maximum current and maximum voltage simultaneously have also been employed in the past. Moreover, it is well known in the art to design resistance into the direct current power supply for the regulating section of a conventional voltage regulating circuit usually associated therewith to protect the series regulating transistor located therein. These protection methods are not entirely satisfactory, inasmuch as in the former case, the additional components are costly and possibly decrease the overall reliability and, in addition, results in the protection of the power supply only. In the latter case, additional operational control requirements encumber the regulating circuits due to the reduced regulation of the direct current supply to the series regulating transistor of the associated conventional voltage regulator circuit and, consequently, a considerable waste of power usually occurs.

The present invention overcomes most of the difficulties and objections existing in conjunction with the known devices of the prior art in that it operates in an exceptionally rapid manner while, at the same time, it functions with vastly increased efficiency, thereby resulting in considerably improved overload and short-circuit protection for associated load equipment incorporating transistors, semiconductors, superconductors, and other electronic circuit components, as well as all other conventional electrical utilization equipment, or the like.

It is, therefore, an object of this invention to provide improved voltage overload, current overload, and short-circuit protection for electrical apparatus.

Another object of this invention is to provide an electrical equipment overload and short-circuit device that is sufficiently fast-acting to prevent damage, ruin, and destruction of the transistors and other semiconductor or superconductor elements contained therein.

A further objective of this invention is to provide an electrical equipment overload and short-circuit protection device that may be adjusted to rapidly switch the load from the power supply in event only a few milli-ampere current increase or excess occurs in the supply circuit.

A still further objective of this invention is to provide an electrical equipment overload and short-circuit protection device that may be adjusted to rapidly switch the load from the power supply in event a very small increase in input voltage occurs.

Another object of this invention is to provide a rapid-switching, transistorized, overvoltage, overload, and short-circuit protection device for electrical and electronic apparatus.

A further objective of this invention is to provide a fast-acting, transistorized, electrical equipment overload and short-circuit protection device that may be adjusted to permit a predetermined, appreciable current or input voltage increase to occur before said electrical equipment is disconnected from its associated power supply.

Still another objective of this invention is to provide an improved overvoltage, overload current, and short-circuit protection device for both the power supply and for the electrical and electronic circuits to which power is supplied therefrom, simultaneously.

A further object of this invention is to provide an improved, rapid-acting, transistorized, electrical equipment, overvoltage, overload current, and short-circuit protection device that may be easily and economically manufactured, installed, and maintained.

Another object of this invention is to provide an overvoltage, overload current, and short-circuit electrical equipment protection device having improved predetermined sensitivity and operational range characteristics.

Another object of this invention is to provide an electrical equipment load protection device that is deleteriously affected to a lesser extent by higher-than-normal ambient temperatures.

Other objects and many of the attendant advantages of this invention will be readily appreciated as the same becomes better understood by reference to the following detailed description when considered in conjunction with the accompanying drawing wherein.

Figure 1:
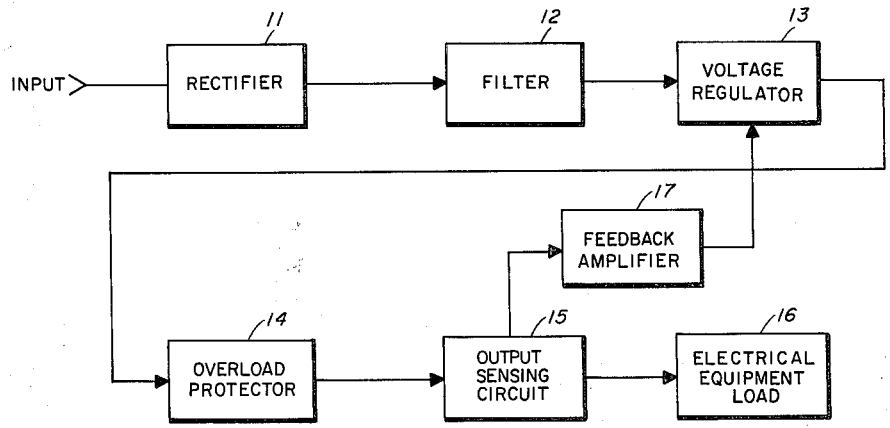
FIG. 1 shows a box diagram of a system for supplying regulated power to associated electrical equipment that is uniquely combined with the overvoltage, overload, and short-circuit protection device of this invention.

Referring now to FIG. 1, there is shown an A.C. voltage input applied to a rectifier 11, the output of which is filtered by a filter 12 to provide a substantially smooth D.C. output voltage. This D.C. voltage is fed to a voltage regulator 13 from which it is applied to an overload protector 14. The electrical output thereof is then sensed for maintenance of predetermined voltage and current levels thereat by an output sensing circuit 15 from which they are passed on as the desired voltage and current to provide optimum, safe, input power to any electrical equipment load 16 associated therewith.

In order to obtain good voltage regulation in the subject system, negative feedback signals are applied through an appropriate feedback amplifier 17 to the aforesaid voltage regulator, as is customary in such voltage regulation means.

It should be understood, furthermore, that with the exception of overload protector 14, all of the other disclosed components are conventional and well known in the art, and that the subject system is only unique in its combination of said conventional components with the aforementioned overload protector as they are concertedly arranged in FIG. 1.

Figure 2:
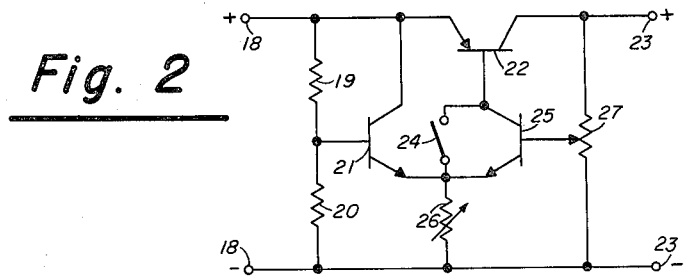
FIG. 2 is a detailed schematic diagram of a preferred embodiment of the overload protector of FIG. 1.

FIG. 2 depicts a simplified version of the preferred embodiments of the aforesaid overload protector as having a pair of D.C. voltage input terminals 18, one of which is positive in potential with respect to the other. A pair of series connected resistors 19 and 20 are effectively connected across said terminals. An NPN transistor 21 has its base connected to the interconnecting junction of the aforementioned resistors 19 and 20, and it has its collector connected to the junction of the other terminal of resistor 19 and the positive terminal of said D.C. voltage terminals. A PNP transistor 22 has its emitter coupled to the collector of NPN transistor 21 and its collector to the positive terminal of a pair of D.C. voltage output terminals 23. The base thereof is connected to one contact of a normally open reset switch 24 and to the emitter of a reversed bias NPN transistor 25. The emitter of transistor 25 is coupled to the other contact of switch 24, the emitter of NPN transistor 21, and one terminal of a variable resistor 26. The other terminal of resistor 26 is connected to the negative terminals of both the D.C. voltage input and output terminals. A potentiometer 27 has its fixed resistance portion connected across said D.C. voltage output terminals and the slider portion thereof coupled to the base of NPN transistor 25.

When a somewhat limited input voltage range of the order, for example, of one to fifteen volts fulfills the input requirements of some given associated electrical equipment load, the overload protector of FIG. 2 provides very satisfactory overload voltage, overload current, and short-circuit protection therefor. To provide such protection, the subject preferred embodiment functions briefly as follows:

Two operational conditions, viz., normal and abnormal will be discussed in turn for the sake of clarity.

During normal operation, the regulated input direct current voltage is maintained at the proper electrical equipment load level. At this time, transistor 21 is off or in the non-conducting state and transistors 22 and 25 are on or in the conducting state. The reset switch is in its normal open position, since it is of the type that must be manually held closed and will automatically open when released. In accordance with the electronic theory, the current is, therefore, supplied to the load via the negative D.C. terminals and conducting transistor 22 to complete the electrical circuit to the positive input terminal. Transistor 22 actually acts as an extremely rapid-acting switch which remains closed unless adverse overload or short-circuit conditions are present. To accomplish this, transistor 25 likewise functions as a switch and controls transistor 22 to hold it on or closed under normal conditions or to switch transistor 22 off or open for overload or short-circuit conditions as will be further explained below. The normal condition current flows from the negative input terminal, through resistor 26, through transistor 25, to and through transistor 22 to the positive input terminal, and thus a substantially constant voltage drop is maintained across resistor 26, which, of course, enables the emitters of transistors 21 and 25 to be held at the proper potentials to make them non-conducting and conducting, respectively. Because transistor 22 is thereby controlled by transistor 25 to be on or closed, the electrical equipment load is effectively supplied with the voltage and current required for proper operation thereof.

During the abnormal conditions of voltage or current overload or short-circuiting of the electrical equipment load, transistor 22 is switched off or open in order to effectively disconnect the electrical equipment load from the regulated D.C. power supply.

When, for some reason or another, such as, for instance, when a short circuit occurs in the load equipment, the supply or load current becomes excessive, this fact is sensed due to the corresponding reduced voltage drop across the fixed resistance portion of potentiometer 27. Hence this voltage reduction is likewise proportionally applied to the base of transistor 25 through the slide portion of potentiometer 27. Since potentiometer 27 was originally set to provide protection at maximum voltage and current levels as described, this was achieved by picking off the appropriate proportional voltage therefrom and applying it to the base of said transistor 25. In event, however, of a decreased voltage drop across the fixed resistance portion of potentiometer 27 due to an excessive load current, the base potential of transistor 25 from the original set point control voltage level is decreased sufficiently to cut off transistor 25 which, in turn, cuts off transistor 22, resulting in the opening of the electrical circuit to the electrical equipment load being protected. In other words, the normal current through transistors 22 and 25 and resistor 26 is reduced by the reduced base current of transistor 25, which tends to shut off normally conducting transistor 22 and the current output therefrom. Once transistor 22 is started to shut off, the voltage at the pick-off point of resistor 26 tends to go even lower and, due to positive feedback, tends to shut off transistor 22 even more and transistor 25 as well because transistor 25 is controlling the state of transistor 22, thereby, in effect, providing a cumulative action.

If the supply voltage inadvertently increases above the predetermined set level, this fact is sensed by the voltage divider network comprising resistors 19 and 20, and a corresponding proportional voltage increase is applied to the base of transistor 21 which causes it to change from a nonconductive state to a conductive state, allowing increased current to flow through resistor 26, through the emitter and to the collector of transistor 21, to the positive input terminal. Accordingly, the potential of the emitter of transistor 25 is made more positive relative to the base thereof and cuts it off. In turn, transistor 22 is again cut off when transistor 25 is cut off, and the electrical circuit to the electrical equipment load is effectively switched off.

For stabilization purposes during normal operation, it is desired to maintain an essentially constant voltage across resistor 26. Since the base potential of transistor 21 is practically set by the voltage of the junction of resistors 19 and 20, when the voltage at the emitters of transistors 21 and 25 drops due to reduced current through transistors 22 and 25, the voltage differential between the base and emitter of transistor 21 is increased, causing greater current to flow through resistor 26 and through transistor 21 to the positive input terminal, thereby tending to increase the voltage across resistor 26. This increased voltage, of course, tends to increase the potential at the emitters of transistors 21 and 25 to bring them back to the potential they originally were or should be when the load current is at its normal predetermined level. Thus, it can be seen that the electrical balance of the system is such as to provide the correct load voltage and current, and when either becomes dangerously unbalanced, the electrical equipment load is effectively disconnected from the regulated D.C. power supply by the switching action of transistor 22.

Because the entire operation of the subject circuit is extremely rapid, for all practical purposes, the electrical equipment load is switched off before any damage is done thereto even through it may be transistorized or contain other semiconductor or superconductor components requiring fast protective action.

Once the electrical load has been effectively disconnected from its regulated D.C. power supply because of overload or short-circuit conditions, it may only be restarted by means of reset switch 24, the temporary closing of which re-establishes the normal conductive state of transistor 22.

Obviously, however, restart should not be effected until the overload, short-circuit, or other adverse conditions have been corrected. After such normal conductive state has been re-established, reset switch 24 is opened, as is the case with most conventional reset switch mechanisms.

Figure 3:
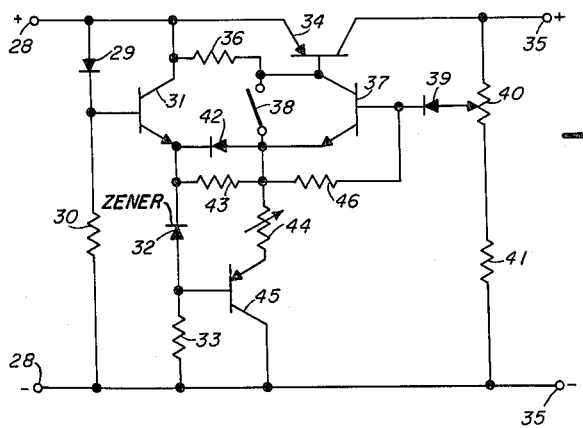
FIG. 3 is a detailed schematic diagram of another preferred embodiment of the overload protector of FIG. 1.

Referring now to FIG. 3 there is shown the preferred embodiment of the subject overload protector that has, primarily, an increased voltage range of the order of ten to fifty volts compared with that of the embodiment depicted in FIG. 2. As illustrated, it, too, has a pair of input D.C. voltage terminals 28, one of which is positive with respect to the other. Connected across said input D.C. voltage terminals is a silicon diode 29 biased in the forward direction coupled in series with a resistor 30. An NPN transistor 31 has its base connected to the junction of the aforementioned diode 29 and resistor 30 and its collector coupled to the positive terminal of input terminals 28. The emitter thereof is coupled through a zener reference diode 32 biased in the reverse direction and a resistor 33 to the negative terminal of said input terminals 28. The collector of transistor 31, is coupled to the emitter of a PNP transistor 34, the collector of which is connected to the positive terminal of a pair of D.C. voltage output terminals 35. A resistor 36 is connected between the collector of transistor 31 and the base of transistor 34. The collector of a NPN transistor 37 is likewise connected to the base of said transistor 34, and interconnecting the emitter and collector of transistor 37 is a normally open manual reset switch 38 which may, for example, be of the push-button type that is electrically closed only during the time the button is being pushed and automatically opens when the button is released. The base of transistor 37 is coupled through a high conductance germanium diode 39 that is forward biased during normal operation to the voltage pick-off slide portion of a potentiometer 40, the fixed resistance portion of which is series connected with a resistor 41 to form a voltage divider network that is connected across the D.C. voltage output terminals 35.

A more sophisticated stabilization means for maintaining a substantially constant voltage at the emitter of transistor 37 results when the aforementioned disclosed elements are associated and combined with a high conductive germanium diode 42 that is parallel connected with a resistor 43 and both are connected between the emitters of transistors 31 and 37. Also included therein is a variable resistor 44, of lesser resistance than resistor 43, that interconnects the emitter of transistor 37 and the emitter of PNP transistor 45. The base of transistor 45 is connected to the junction of series connected diode 32 and resistor 33 and the collector thereof is connected to the interconnected negative terminals of input and output terminals 28 and 35. A resistor 46 is coupled between the emitter and base of transistor 37 and acts as a voltage divider with the reverse resistance of diode 39, during abnormal operational conditions.

As in the embodiment of FIG. 2, the overload protector embodiment of FIG. 3 uses various and sundry type transistors. However, it should be understood that PNP transistors may be substituted for NPN transistors and vise versa merely by changing the bias thereof, accordingly and that other comparable rapid acting switching means such as, for instance, appropriate electronic, magnetic, electromagnetic, tunneling, superconductors, or semiconductors or the like may also be substituted therefor because so doing would be obvious to those skilled in the art, and, therefore, should be considered as part of the teaching of this invention.

For the most part, the operation of the embodiment of FIG. 3 is substantially comparable to the operation of the embodiment of FIG. 2 with the exception of the increased voltage range characteristic resulting from the more sophisticated voltage stabilization mentioned previously. Briefly, the function thereof is again presented as follows during both normal and abnormal operation of the entire system.

During normal operating conditions transistor 31 is off or nonconducting and transistors 34, 37, and 45 are on or in a conducting state. Inasmuch as reset switch 38 is of the type that must be manually held closed and is, therefore, normally open, it is ineffective during normal operation. If considered from the standpoint of the electronic theory, the load current flows from the negative output electrode, through the electrical equipment load, and through conducting transistor 34 to complete the circuit back to the voltage regulated power supply. Again, it can be seen that transistor 34 actually functions as an extremely fast-acting switch, and that the load is connected to the power supply when it is closed or conducting and disconnected therefrom when it is off or in a nonconducting state. The load, of course, remains connected to the power supply during normal operations, but becomes disconnected therefrom upon the existence of adverse current overload, supply voltage overload or shortcircuit conditions. This situation is achieved because transistor 37 also acts as a switch which controls transistor 34 to hold it on or closed when none of the aforementioned adverse conditions occur. Transistor 37 is normally maintained in the conducting state by current flowing from the negative input terminal through the two paths represented by resistor 33, diode 32, diode 42, and resistor 43 as the first path and transistor 45 and resistor 44 as the second path. These two path currents then combine and flow through transistor 37 and through transistor 34 and resistor 36 back to the positive input terminal. Primarily because of the combination of resistor 33, and diode 32, transistor 45, and resistor 44, transistor 37 operates at a substantially constant current supply. Likewise, transistor 31 operates at a substantially constant current load, but the action of diode 42 in conjunction with the resistance of resistor 43 lowers the value of constant current load for transistor 31, so that when it is on or conducting, it can switch transistor 37 off with considerably less current than would be required when transistor 37 is on. Hence, it can be seen that the combination of elements comprising transistor 45, resistor 44, resistor 33, and diode 32 permit the range of the output voltage to be from, for instance, ten to fifty volts and more efficient operation results without requiring manually operated switches and resistors to be employed to change the output voltage range.

Diode 29 and resistor 30 determine and provide the operating bias for the base of transistor 31, and resistor 36 in the base-emitter circuit of transistor 34 supplies the leakage current therefor and permits overall operation at lower output currents and high ambient temperatures. The network of diode 39 and resistor 46 is such that at maximum input voltage the reverse back bias on the emitter-base junction of transistor 37 is less than the maximum rated value thereat when it is in the off condition. Since potentiometer 40 and resistor 41 essentially constitute a variable output voltage divider network, the setting at which the overload protector will disconnect said electrical equipment from the power supply may be regulated in accordance with the controlling proportional pick-off voltage applied to the base of transistor 37 from the adjustable slide member of said potentiometer. If for some reason or another this pick-off voltage is reduced below the proportional equivalent of the set level due to current overload or a short circuit in the electrical equipment, transistor 37 is shut off which, inturn, shuts down transistor 34, which, also in turn, acts as an open switch and effectively disconnects said electrical equipment from its power source.

In event the input voltage supply inadvertently becomes excessive, the input voltage divider network of diode 29 and resistor 30 applies an increased potential to the base of transistor 31, thereby causing it to conduct and draw additional current through the aforementioned pair of electrical paths comprising resistor 33, diode 32, resistance 43, diode 42, transistor 45, and resistor 44 to provide an increase potential at the emitter of transistor 37. This increased emitter potential at the emitter of transistor 37, This increased emitter potential, in essence, reduces the potential differential between the emitter and base of transistor 37, causing it to become reversed biased and non-conductive. Actually, the emitter potential of transistor 37 tends to be held up and maintained positive at this time by the current flowing through transistor 45, resistor 44, resistor 43, and transistor 31; therefore, the emitter-base junction is back biased by the following approximate mathematical ratio:

$$\frac{R_{46}}{R_{39}} = \frac{V_{37}}{V_{E37}}$$

where:

$R_{46}$ is the resistance of resistor 46,
$R_{39}$ is the reverse or back resistance of diode 39,
$V_{37}$ is the back bias of transistor 37,
$V_{E37}$ is the potential difference between the negative input terminal 28 and the emitter of transistor 37. Of course, as mentioned before, when transistor 37 becomes non-conductive, it shuts off transistor 34, and effectively disconnects the electrical equipment from its power source.

Once the overload or shortcircuit difficulties have been corrected and it is desired to again energize the electrical equipment load, reset switch 38 is momentarily manually operated to a closed position to again apply the proper bias necessary to put transistors 37 and 34 in their normal conductive condition and, thus, reconnect said electrical equipment load to its power source, after which it is released and allowed to remain open during normal operation thereat.

Obviously many modifications and variations of the present invention are possible in the light of the above teachings. It is, therefore, to be understood, that within the scope of the appended claims, the invention may be practiced otherwise than as specifically described.

What is claimed is:

1. An overload protection device adapted for preventing voltage and current overloading of electrical utilization equipment comprising in combination, a first transistor means for switching the supply current to and from said electrical utilization equipment during normal and overload conditions respectively, a first voltage divider network connected to said first transistor means for effectively sensing the level of said supply current, a second transistor coupled to said first voltage divider and said first transistor for controlling same in accordance with the level of said supply current, a second voltage divider network coupled between said first transistor and said first voltage divider network, for effectively sensing the level of the supply voltage to said electrical utilization equipment means, and means interconnecting said second voltage divider network and said first and second transistor means for maintaining a substantially constant reference voltage thereat during normal operating conditions.

2. An overload protector comprising in combination, a positive and a negative input terminal, a positive and a negative output terminal, said negative output terminal being connected to said negative input terminal, a first switch means interconnecting said positive input and output terminals, a first voltage divider network coupled across said input terminals, a second voltage divider network coupled across said output terminals, a second switch means connected between said first switch means and said second voltage divider network, a third switch means connected to said first and second switch means and said first voltage divider, and means interconnecting said negative input and output terminals and said second and third switch means for substantially providing a predetermined reference potential thereat.

3. Means for providing electrical damage protection of transistorized electrical equipment due to voltage and current overload comprising in combination, a fast-acting transistor switch adapted for connecting and disconnecting transistorized electrical utilization equipment to and from a power supply, said electrical utilization equipment being connected to said power supply during normal operation at given voltage and current levels and disconnected therefrom during abnormal operation where either of said voltage or current levels exceed the levels thereof that provide said normal operation, means connected to said transistor switch means for effectively sensing a deviation of said current from said given level, control means interconnecting said transistor switch and said current deviation sensing means for closing said transistor switch when said current is at said given level and opening said transistor switch when said current exceeds said given level, means coupled to said transistor switch for sensing a deviation of said voltage from said given level, and means connected to said transistor switch, said voltage deviation sensing means, and said control means for effectively closing said transistor switch when said voltage is at said given level and opening said transistor switch when said voltage exceeds said given level.

4. The device of claim 3 wherein said means connected to said transistor switch means for effectively sensing a deviation of said current from said given level includes an adjustable resistance means adapted for effectively presetting the control point at said given current level.

5. The device of claim 3 wherein said control means interconnecting said transistor switch and said current deviation sensing means for closing said transistor switch when said current is at said given level and opening said transistor switch when said current is at said given level and the aforesaid means connected to said transistor switch, said voltage deviation sensing means, and said control means for effectively closing said transistor switch when said voltage is at said given level and opening said transistor switch when said voltage exceeds said given level includes a variable voltage range control means in common therewith.

6. The device of claim 3 further characterized by a reset switch connected to said control means and the aforesaid transistor switch.

7. An overload short-circuit protection device adapted for protecting transistorized utilization apparatus comprising in combination, a pair of direct current input terminals one of which is positive with respect to the other, a first voltage divider network connected across said input terminals, a first transistor having an emitter, a base, and a collector, a pair of direct current output terminals one of which is positive with respect to the other and the other of which is negative and connected to the other of said pair of direct current input terminals, said first transistor having the emitter and collector thereof connected to said positive direct current input and output terminals respectively, a second transistor having an emitter, a base, and a collector, a second voltage divider network having a potentiometer and a resistor connected in series across said output terminals, the base of said second transistor effectively connected to said potentiometer and the collector thereof coupled to the base of said first transistor, a third transistor having a base connected to said first voltage divider network, an emitter effectively connected to the emitter of said second transistor, and a collector coupled to the emitter of said first transistor, adjustable sensitivity means effectively interconnecting the emitters of said second and third transistors and said negative input and output terminals for providing a substantially regulated predetermined reference potential therebetween, and a reset switch connected across the emitter and collector of the aforementioned second transistor.

8. The device of claim 7 wherein said first, second and third transistors are PNP, NPN, and NPN transistors, respectively.

9. The device of claim 8 further characterized by a resistor connected between the interconnected base and collector of said first and second transistors and the interconnection of the emitter and collector of said first and third transistors.

10. A voltage overload, current overload, short-circuit protection device adapted for providing electrical damage protection for electrical utilization equipment comprising in combination, a fast-acting switching means for connecting and disconnecting electrical utilization equipment to and from an appropriate electrical power supply during abnormal operation where either of said voltage and current levels exceed said normal predetermined levels respectively, means connected to said fast-acting switching means for effectively sensing a deviation of said current from said predetermined level, control switch means interconnecting said fast-acting switch means and said current deviation sensing means for closing said fast-acting switching means when said current is at said predetermined level and opening said fast-acting switching means when said current exceeds said predetermined level, means coupled to said fast-acting switching means for sensing a deviation of said voltage from said given level, and means connected to said fast-acting switching means, said voltage deviation sensing means, and said control switch means for effectively closing said fast-acting switching means when said voltage is at said predetermined level and opening said fast-acting switching means when said voltage exceeds said predetermined level.

References Cited in the file of this patent
UNITED STATES PATENTS

| | | |
|---|---|---|
| 2,841,746 | Mawhinney | July 1, 1958 |
| 2,915,693 | Harrison | Dec. 1, 1959 |
| 2,963,637 | Osborn | Dec. 6, 1960 |